C. T. SILBERG.
CLAMP.
APPLICATION FILED SEPT. 12, 1917.
1,267,918.
Patented May 28, 1918.
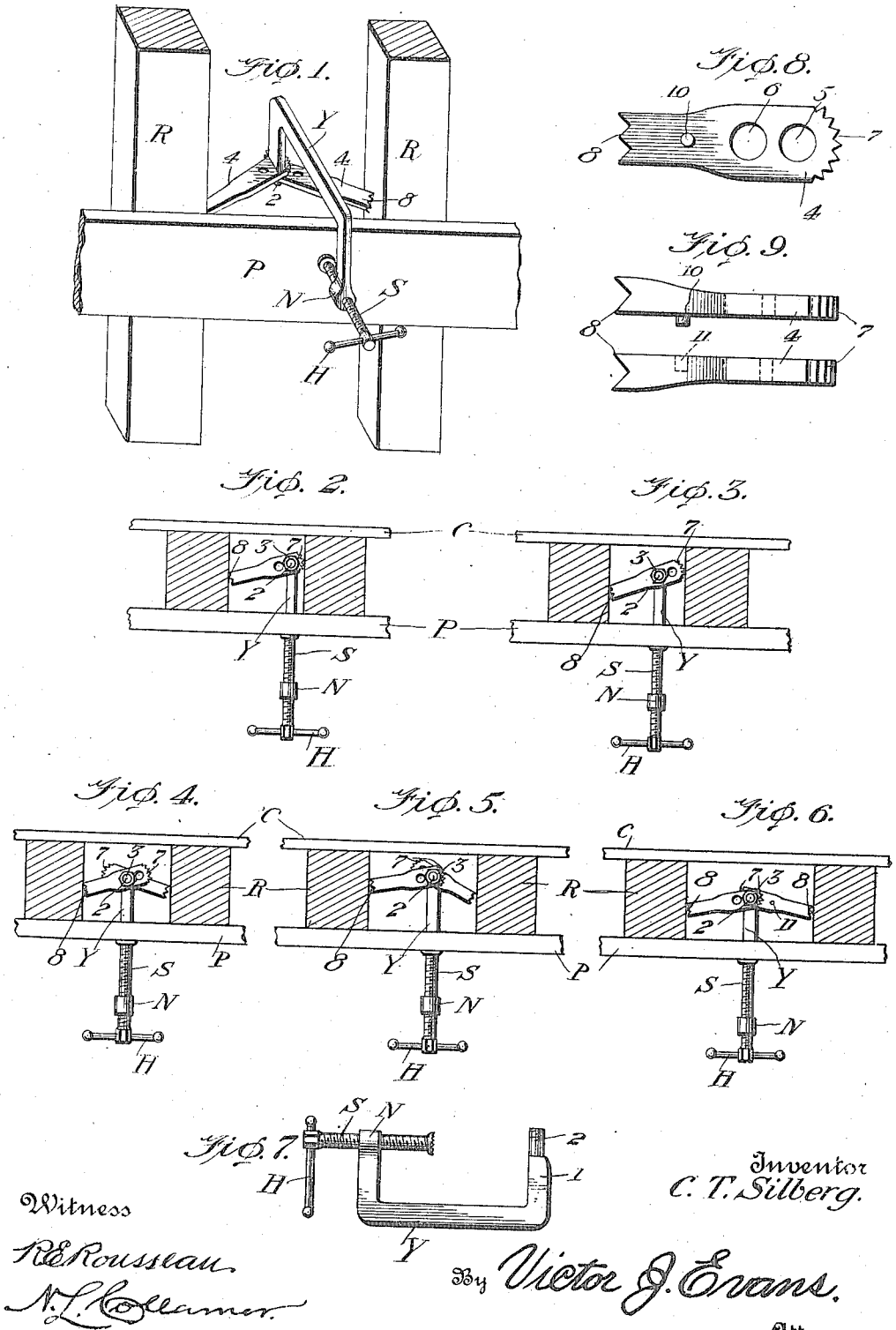

UNITED STATES PATENT OFFICE.

CARL THEADAR SILBERG, OF BELLINGHAM, WASHINGTON.

CLAMP.

1,267,918.  Specification of Letters Patent.  Patented May 28, 1918.

Application filed September 12, 1917. Serial No. 191,042.

*To all whom it may concern:*

Be it known that I, CARL T. SILBERG, a citizen of the United States, residing at Bellingham, in the county of Whatcom and State of Washington, have invented new and useful Improvements in Clamps, of which the following is a specification.

This invention relates to wood working tools, and more especially to portable clamps for use particularly in planking ships; and the object of the same is to produce a clamp of this character involving improvements in the details of its dogs so that they may be used singly or jointly between ribs variously spaced, and so that in fact the clamp may be used in other ways and in other work.

Details will be found below and reference is made to the drawings wherein—

Figure 1 is a perspective view showing this improved clamp in use.

Figs. 2 to 6 are diagrams showing the employment of its dogs in different ways.

Fig. 7 is a side elevation of the yoke, Fig. 8 is a side elevation of one dog, and Fig. 9 an edge view of both.

In the drawings I have used letters R to designate the timbers or ribs of a ship's hull. C is a skin or ceiling on the inside, and P are the boards or planks on the outside. Owing to the fact that the skin is usually applied first, tools must be provided for holding the planks in place without reaching completely through the ribs and hooking around them which would be the logical course to follow, and accordingly a special form of clamp has come into use having cams or dogs working ordinarily on the toggle principle between the contiguous faces of the spaced ribs, to resist the strain which occurs when the set screw is tightened. The letter Y designates the yoke and S the screw of an ordinary clamp, the screw being threaded through a nut N in one arm of the yoke and having a handle H as usual, and the other arm of the yoke coacting with dogs of the improved pattern which form subject matter of the present invention.

As shown in Fig. 7, what might be called the inner arm 1 of the yoke is reduced to a threaded stud 2 at its extremity, and on the same is mounted the dog or are mounted both dogs, a nut 3 being finally applied to hold it or them in place. The dog 4 has near its inner end a hole 5 for insertion over said stud as seen in Figs. 2 and 6, and in its body it may have one or more holes 6 for use as seen in Figs. 3 and 4. Its inner end constitutes a cam surface 7 formed around said inner hole for use against the adjacent rib R when the same is very close as seen in Figs. 2 and 3, and its outer end is toothed as at 8 for use against more remote ribs as seen in Figs. 4, 5, and 6. The several diagrams show the various uses of the dogs, making it clear that they are always fulcrumed on the stud 2 but the selection of the proper hole to pass over stud is left to the workman and is dependent in a large measure on the proximity of the contiguous rib or ribs and the position where the clamp is to be set up—in fact Figs. 2 and 3 show how one dog might be of service if the ribs were near enough together, and the selection of the hole 5 or 6 depends on where the workman wants the yoke to stand.

It will be clear from Figs. 8 and 9 that I propose to provide one dog with a stud or dowel pin 10 and the other with a hole or socket 11 so disposed that when the dogs are accurately superposed with the dowel in the socket, their other holes will register—therefore the diagrams in Figs. 2 and 3 may each show a single dog or a pair of dogs so superposed. As an elaboration of the idea, each clamp might be equipped with a longer pair of dogs, perhaps having several holes 5 and 6, so that these could be used where the ribs were quite widely spaced. I have spoken of the tool as employed in ship building because it finds its greatest service there, but it is obvious that it could be used elsewhere with advantage.

What is claimed is:

1. In a clamp of the class described, the combination with a yoke having an upstanding threaded stud on one arm and a nut on its other arm, and a screw threaded through the nut; of a pair of dogs each having two material engaging ends and a plurality of holes through its body intermediate its ends for selective engagement with said stud at right angles to the yoke, and means for removably holding the dogs thereon.

2. In a clamp for ship's planking, the combination with a yoke having a stud and screw; of a pair of dogs whereof each has a series of holes for selective engagement with said stud at right angles to the yoke, and a dowel in one dog and a socket in the other for holding them superposed in registry when desired.

In testimony whereof I affix my signature.

CARL THEADAR SILBERG.

Copies of this patent may be obtained for five cents each, by addressing the "Commissioner of Patents, Washington, D. C."